United States Patent
Greasby (10) Patent No.: US 8,258,978 B2
(45) Date of Patent: Sep. 4, 2012

(54) SPEED LIMIT CHANGE NOTIFICATION

(75) Inventor: Steven P. Greasby, Olathe, KS (US)

(73) Assignee: Garmin Switzerland GmbH (CH)

( * ) Notice: Subject to any disclaimer, the term of this patent is extended or adjusted under 35 U.S.C. 154(b) by 254 days.

(21) Appl. No.: 12/783,322

(22) Filed: May 19, 2010

(65) Prior Publication Data

US 2011/0288770 A1 Nov. 24, 2011

(51) Int. Cl.
*G08G 1/00* (2006.01)
(52) U.S. Cl. ......... 340/901; 701/532; 340/438; 340/461
(58) Field of Classification Search .................. 701/200; 340/438, 461, 905
See application file for complete search history.

(56) References Cited

U.S. PATENT DOCUMENTS

| | | | | |
|---|---|---|---|---|
| 6,008,740 | A | 12/1999 | Hopkins | 340/905 |
| 6,388,578 | B1* | 5/2002 | Fagan et al. | 340/901 |
| 6,633,811 | B1* | 10/2003 | Aumayer | 701/409 |
| 6,728,605 | B2 | 4/2004 | Lash et al. | 701/1 |
| 6,778,074 | B1 | 8/2004 | Cuozzo | 304/441 |
| 2005/0083187 | A1* | 4/2005 | Birman et al. | 340/438 |
| 2007/0001830 | A1* | 1/2007 | Dagci et al. | 340/438 |
| 2007/0050130 | A1* | 3/2007 | Grimm et al. | 701/208 |
| 2007/0200694 | A1* | 8/2007 | Mortara et al. | 340/461 |
| 2008/0218378 | A1* | 9/2008 | Bakken et al. | 340/870.03 |
| 2009/0149717 | A1* | 6/2009 | Brauer et al. | 600/300 |
| 2009/0208058 | A1* | 8/2009 | Schofield et al. | 382/103 |
| 2010/0207787 | A1* | 8/2010 | Catten et al. | 340/905 |
| 2010/0318288 | A1* | 12/2010 | Korn et al. | 701/201 |

OTHER PUBLICATIONS

Excel Conditional Formatting Introduction. (http://www.contextures.com/xlcondFormat01.html). Retrieved Feb. 6, 2010.*
Conditional Format to yellow if "?" char appears in cell. (http://www.mrexcel.com/archive/Formulas/32391.html). Retrieved Sep. 29, 2001.*
Garmin nuvi 1350 Owner's Manual, published Apr. 2009, pp. iv and 15.

* cited by examiner

*Primary Examiner* — Gerald J. O'Connor
*Assistant Examiner* — Jonathan K Ng
(74) *Attorney, Agent, or Firm* — Samuel M. Korte; Mohammad M. Ali (57) ABSTRACT

Techniques are described that may be implemented in a mobile electronic device providing navigation functionality to furnish a notification that the indicated speed limit of a roadway being traversed has changed. In an implementation, the display of the mobile electronic device is configured to display navigation information including a roadway graphic representing a roadway being traversed by the mobile electronic device and a speed limit indicator graphic for indicating the speed limit associated with the roadway. When a change in the indicated speed limit is encountered, an attribute of the navigation information is temporarily altered to provide a notification of the change.

19 Claims, 7 Drawing Sheets

SPEED LIMIT CHANGE NOTIFICATION

BACKGROUND

Because of their relatively small size and form, mobile electronic devices such as personal navigation devices (PNDs), smart phones, mobile phones, personal digital assistants (PDAs), and so forth, offer several practical advantages with respect to providing maps and map-related content to a user. For example, because of their small form and consequent portability, mobile electronic devices are capable of providing real-time navigational instructions to users in a convenient fashion, while the users are in route to a destination.

Often, the map data employed by such mobile electronic devices to provide navigation functionality includes speed limit information for roadways traversed by the user. The speed limit information may be displayed by the mobile electronic device to inform the user of the speed limit of the roadway being traversed. In this manner, the user may be made aware of the speed limit without resort to signs posted along the roadway, which often may not be easily viewable due to weather conditions, traffic, and so on.

SUMMARY

Techniques are described that may be implemented in a mobile electronic device providing navigation functionality to furnish a notification that the indicated speed limit of a roadway being traversed has changed. In an implementation, the display of the mobile electronic device is configured to display navigation information including a roadway graphic representing a roadway being traversed and a speed limit indicator graphic for indicating the speed limit associated with the roadway. When a change in the indicated speed limit is encountered, an attribute of navigation information is temporarily altered to provide a notification of the change.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Increasingly, map data employed by mobile electronic devices providing navigation functionality may include speed limit information for roadways that are traversed by the user of the device. Thus, where speed limit information is available, the posted speed limit for a section of the roadway being traversed may be displayed by the device within a speed limit indicator graphic. However, the speed limit indicated by the speed limit indicator graphic is often used in a reactionary manner in that the user of the mobile electronic device typically references the speed limit indicator only when he or she is unsure of the speed limit for the section of roadway being traversed.

Accordingly, techniques are described that may be implemented in the mobile electronic device to furnish an easily discernable, visual notification that the indicated speed limit of a roadway being traversed has changed or is about to change. In an implementation, the display of the mobile electronic device is configured to display navigation information including a map, a roadway graphic representing a roadway being traversed by the mobile electronic device displayed on the map, and a speed limit indicator graphic for indicating the speed limit associated with the roadway. When a change in the indicated speed limit associated with the roadway is encountered, an attribute of the navigation information is temporarily altered to provide a notification of the change. In embodiments, the attribute is changed in a manner that indicates the type of change in the indicated speed limit displayed in the speed limit indicator graphic. For instance, the hue of the map or the speed limit indicator graphic may be temporarily changed from a default color to a second color such as red when the indicated speed limit decreases, to a third color such as green when the indicated speed limit increases, and/or to a fourth color such as yellow when speed limit information is not available for the section of roadway being traversed.

The techniques described herein thus allow the mobile electronic device to visually (and/or audibly) notify a user of the device, who may be operating a vehicle, of an actual or expected change in the indicated speed limit, and thus the speed limit of the roadway. In this manner, the techniques allow the user to slow the vehicle when a reduced speed limit is encountered (e.g., to avoid a traffic violation), to accelerate the vehicle when an increased speed limit is encountered (e.g., to shorten drive time), and/or to give greater attention to signs along the roadway when speed limit information is not available for the roadway being traversed.

In the following discussion, an example mobile electronic device environment is first described. Exemplary procedures are then described that may be employed with the example environment, as well as with other environments and devices without departing from the spirit and scope thereof. Example display screens of the mobile electronic device are then described that may be employed in the illustrated environment, as well as in other environments without departing from the spirit and scope thereof.

Example Environment

Figure 1:
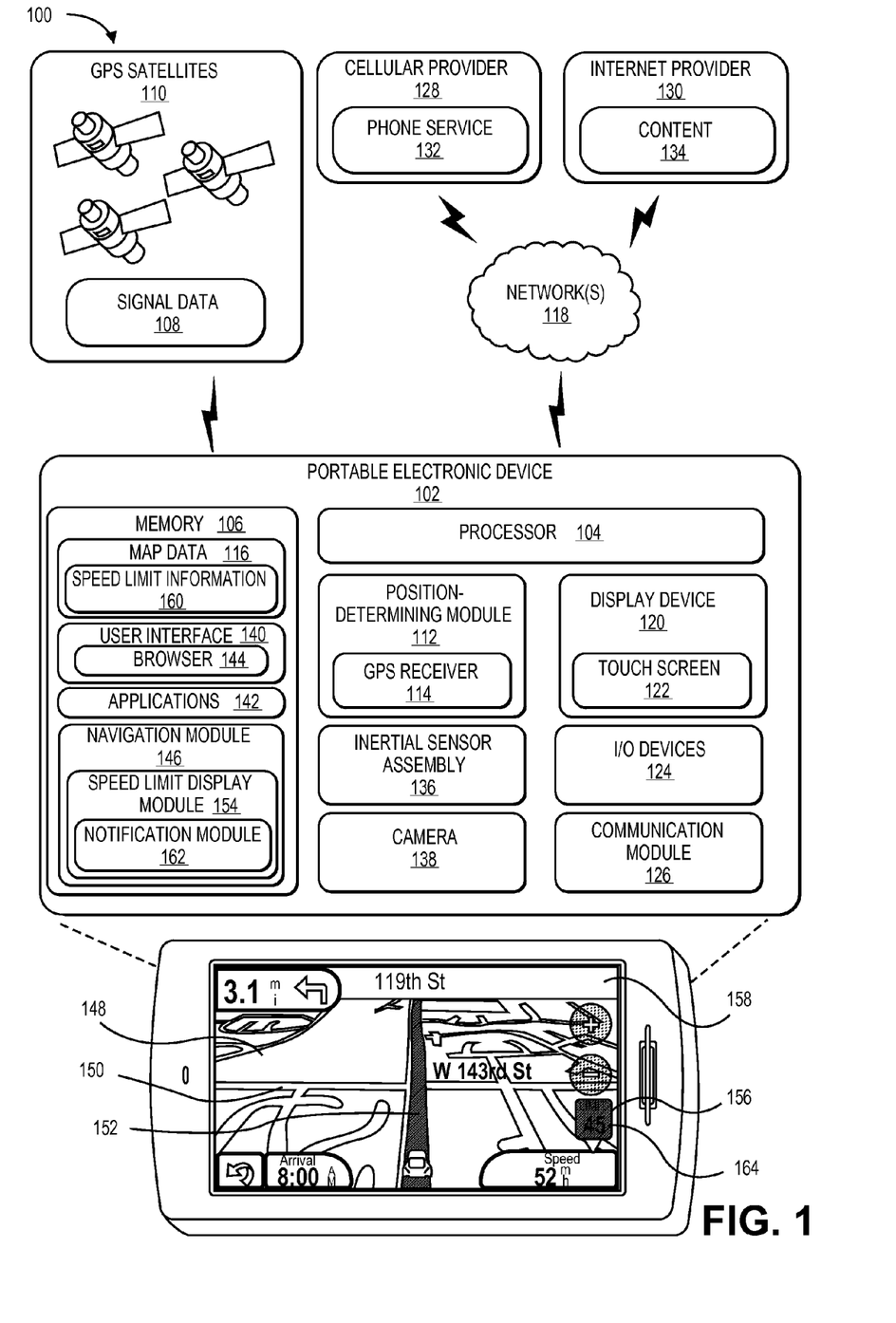
FIG. 1 is an illustration of an example environment in which techniques may be implemented to configure a mobile electronic device providing navigation functionality to furnish a notification of a change in the indicated speed limit of a roadway being traversed.

FIG. 1 illustrates an example mobile electronic device environment 100 that is operable to perform the techniques discussed herein. The environment 100 includes a mobile electronic device 102 operable to provide navigation functionality to the user of the device 102. The mobile electronic device 102 may be configured in a variety of ways. For instance, a mobile electronic device 102 may be configured as a portable navigation device (PND), a mobile phone, a smart phone, a position-determining device, a hand-held portable computer, a personal digital assistant, a multimedia device, a game device, combinations thereof, and so forth. In the following description, a referenced component, such as mobile electronic device 102, may refer to one or more entities, and therefore by convention reference may be made to a single entity (e.g., the mobile electronic device 102) or multiple entities (e.g., the mobile electronic devices 102, the plurality of mobile electronic devices 102, and so on) using the same reference number.

In FIG. 1, the mobile electronic device 102 is illustrated as including a processor 104 and a memory 106. The processor 104 provides processing functionality for the mobile electronic device 102 and may include any number of processors, micro-controllers, or other processing systems and resident or external memory for storing data and other information accessed or generated by the mobile electronic device 102. The processor 104 may execute one or more software programs which implement the techniques and modules described herein. The processor 104 is not limited by the materials from which it is formed or the processing mechanisms employed therein and, as such, may be implemented via semiconductor(s) and/or transistors (e.g., electronic integrated circuits (ICs)), and so forth.

The memory 106 is an example of device-readable storage media that provides storage functionality to store various data associated with the operation of the mobile electronic device 102, such as the software program and code segments mentioned above, or other data to instruct the processor 104 and other elements of the mobile electronic device 102 to perform the techniques described herein. Although a single memory 106 is shown, a wide variety of types and combinations of memory may be employed. The memory 106 may be integral with the processor 104, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the mobile electronic device 102, the memory 106 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The mobile electronic device 102 is further illustrated as including functionality to determine position. For example, mobile electronic device 102 may receive signal data 108 transmitted by one or more position data platforms and/or position data transmitters, examples of which are depicted as the GPS satellites 110. More particularly, mobile electronic device 102 may include a position-determining module 112 that may manage and process signal data 108 received from Global Positioning System (GPS) satellites 110 via a GPS receiver 114. The position-determining module 112 is representative of functionality operable to determine a geographic position through processing of the received signal data 108. The signal data 108 may include various data suitable for use in position determination, such as timing signals, ranging signals, ephemerides, almanacs, and so forth.

Position-determining module 112 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, the position-determining module 112 may be configured in a variety of ways to perform a wide variety of functions. For example, the position-determining module 112 may be configured for outdoor navigation, vehicle navigation, aerial navigation (e.g., for airplanes, helicopters), marine navigation, personal use (e.g., as a part of fitness-related equipment), and so forth. Accordingly, the position-determining module 112 may include a variety of devices to determine position using one or more of the techniques previously described.

The position-determining module 112, for instance, may use signal data 108 received via the GPS receiver 114 in combination with map data 116 that is stored in the memory 106 to generate navigation instructions (e.g., turn-by-turn instructions to an input destination or POI), show a current position on a map, and so on. Position-determining module 112 may include one or more antennas to receive signal data 108 as well as to perform other communications, such as communication via one or more networks 118 described in more detail below. The position-determining module 112 may also provide other position-determining functionality, such as to determine an average speed, calculate an arrival time, and so on.

Although a GPS system is described and illustrated in relation to FIG. 1, it should be apparent that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, and magnetometers), use of "dead reckoning" techniques, and so on.

The mobile electronic device 102 includes a display 120 to display information to a user of the mobile electronic device 102. In embodiments, the display 120 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display 120 may be backlit via a backlight such that it may be viewed in the dark or other low-light environments.

The display 120 may be provided with a touch screen 122 for entry of data and commands. For example, a user may operate the mobile electronic device 102 by touching the touch screen 122 and/or by performing gestures on the screen 122. In some embodiments, the touch screen 122 may be a capacitive touch screen, a resistive touch screen, an infrared touch screen, combinations thereof, and the like. The mobile electronic device 102 may further include one or more input/output (I/O) devices 124 (e.g., a keypad, buttons, a wireless input device, a thumbwheel input device, a trackstick input device, and so on). The I/O devices 124 may include one or more audio I/O devices, such as a microphone, speakers, and so on.

The mobile electronic device 102 may also include a communication module 126 representative of communication functionality to permit mobile electronic device 102 to send/receive data between different devices (e.g., components/peripherals) and/or over the one or more networks 118. Communication module 126 may be representative of a variety of communication components and functionality including, but not limited to: one or more antennas; a browser; a transmitter and/or receiver; a wireless radio; data ports; software interfaces and drivers; networking interfaces; data processing components; and so forth.

The one or more networks 118 are representative of a variety of different communication pathways and network connections which may be employed, individually or in combinations, to communicate among the components of the environment 100. Thus, the one or more networks 118 may be representative of communication pathways achieved using a single network or multiple networks. Further, the one or more networks 118 are representative of a variety of different types of networks and connections that are contemplated including, but not limited to: the Internet; an intranet; a satellite network; a cellular network; a mobile data network; wired and/or wireless connections; and so forth.

Examples of wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

The mobile electronic device 102 through functionality represented by the communication module 126 may be configured to communicate via one or more networks 118 with a cellular provider 128 and an Internet provider 130 to receive mobile phone service 132 and various content 134, respectively. Content 134 may represent a variety of different content, examples of which include, but are not limited to: map data which may include speed limit data; web pages; services; music; photographs; video; email service; instant messaging; device drivers; instruction updates; and so forth.

The mobile electronic device 102 may further include an orientation sensor 136 that represents functionality to determine various manual manipulation of the device 102. Orientation sensor 136 may be configured in a variety of ways to provide signals to enable detection of different manual manipulation of the mobile electronic device 102 including detecting orientation, motion, speed, impact, and so forth. For example, orientation sensor 136 may be representative of various components used alone or in combination, such as an accelerometer, gyroscope, velocimeter, capacitive or resistive touch sensor, and so on.

The mobile electronic device 102 of FIG. 1 may be provided with an integrated camera 138 that is configured to capture media such as still photographs and/or video by digitally recording images using an electronic image sensor. Media captured by the camera 138 may be stored as digital image files in memory 106. In embodiments, the digital image files may be stored using a variety of file formats. For example, digital photographs may be stored using a Joint Photography Experts Group standard (JPEG) file format. Other digital image file formats include Tagged Image File Format (TIFF), Raw data formats, and so on. Digital video may be stored using a Motion Picture Experts Group (MPEG) file format, an Audio Video Interleave (AVI) file format, a Digital Video (DV) file format, a Windows Media Video (WMV) format, and so forth. Exchangeable image file format (Exif) data may be included with digital image files to provide metadata about the image media. For example, Exif data may include the date and time the image media was captured, the location where the media was captured, and the like. Digital image media may be displayed by display 120 and/or transmitted to other devices via a network 118 (e.g., via an email or MMS text message).

The mobile electronic device 102 is illustrated as including a user interface 140, which is storable in memory 106 and executable by the processor 104. The user interface 140 is representative of functionality to control the display of information and data to the user of the mobile electronic device 102 via the display 120. In some implementations, the display 120 may not be integrated into the mobile electronic device and may instead be connected externally using universal serial bus (USB), Ethernet, serial connections, and so forth. The user interface 140 may provide functionality to allow the user to interact with one or more applications 142 of the mobile electronic device 102 by providing inputs via the touch screen 122 and/or the I/O devices 124. For example, the user interface 140 may cause an application programming interface (API) to be generated to expose functionality to an application 142 to configure the application for display by the display 120 or in combination with another display. In embodiments, the API may further expose functionality to configure the application 142 to allow the user to interact with an application by providing inputs via the touch screen 122 and/or the I/O devices 124.

Applications 142 may comprise software, which is storable in memory 106 and executable by the processor 104, to perform a specific operation or group of operations to furnish functionality to the mobile electronic device 102. Example applications may include cellular telephone applications, instant messaging applications, email applications, photograph sharing applications, calendar applications, address book applications, and so forth.

In implementations, the user interface 140 may include a browser 144. The browser 144 enables the mobile electronic device 102 to display and interact with content 134 such as a webpage within the World Wide Web, a webpage provided by a web server in a private network, and so forth. The browser 144 may be configured in a variety of ways. For example, the browser 144 may be configured as an application 142 accessed by the user interface 140. The browser 144 may be a web browser suitable for use by a full resource device with substantial memory and processor resources (e.g., a smart phone, a personal digital assistant (PDA), etc.). However, in one or more implementations, the browser 144 may be a mobile browser suitable for use by a low-resource device with limited memory and/or processing resources (e.g., a mobile telephone, a portable music device, a transportable entertainment device, etc.). Such mobile browsers typically conserve memory and processor resources, but may offer fewer browser functions than web browsers.

The mobile electronic device 102 is illustrated as including a navigation module 146, which is storable in memory 106 and executable by the processor 104. The navigation module 146 represents functionality to access map data 116 that is stored in the memory 106 to provide mapping and navigation functionality to the user of the mobile electronic device 102.

For example, the navigation module 146 may generate navigation information that includes maps and/or map-related content for display by display device 120. As used herein, map related content includes information associated with maps generated by the navigation module 146 and may include speed limit information, POIs, information associated with POIs, map legends, controls for manipulation of a map (e.g., scroll, pan, etc.), street views, aerial/satellite views, and the like, displayed on or as a supplement to one or more maps.

In one or more implementations, the navigation module 146 is configured to utilize the map data 116 to generate navigation information that includes maps and/or map-related content for display by the mobile electronic device 102 independently of content sources external to the mobile electronic device 102. Thus, for example, the navigation module 146 may be capable of providing mapping and navigation functionality when access to external content 134 is not available through network 118. It is contemplated, however, that the navigation module 146 may also be capable of accessing a variety of content 134 via the network 118 to generate navigation information including maps and/or map-related content for display by the mobile electronic device 102 in one or more implementations.

The navigation module 146 may be configured in a variety of ways. For example, the navigation module 146 may be configured as an application 142 accessed by the user interface 140. The navigation module 146 may utilize position data determined by the position-determining module 112 to show a current position of the user (e.g., the mobile electronic device 102) on a displayed map, furnish navigation instructions (e.g., turn-by-turn instructions to an input destination or POI), calculate driving distances and times, cargo load regulations, and so on.

As shown in FIG. 1, the navigation module 146 may cause the display 120 of the mobile electronic device 102 to be configured to display navigation information 148 that includes a map 150, which may be a moving map, that includes a roadway graphic 152 representing a roadway being traversed by a user of the mobile electronic device 102 (e.g., by a vehicle operated by the user in or on which the mobile electronic device 102 is mounted or carried or some combination thereof). The roadway represented by the roadway graphic 152 can comprise, without limitation, any navigable path, trail, road, street, pike, highway, tollway, freeway, interstate highway, combinations thereof, or the like, that may be traversed by a user of the mobile electronic device 102. It is contemplated that a roadway may include two or more linked but otherwise distinguishable roadways traversed by a user of the mobile electronic device 102. For example, a roadway may include a first highway, a street intersecting the highway, and an off-ramp linking the highway to the street. Other examples are possible.

The mobile electronic device 102 is also illustrated as including a speed limit display module 154, which is storable in memory 106 and executable by the processor 104. The speed limit display module 154 is representative of functionality to cause speed limits to be displayed by the mobile electronic device 102 for roadways traversed by the mobile electronic device 102. For example, the speed limit display module 154 may cause a speed limit indicator graphic 156 to be provided as part of the navigation information 148 (e.g., on the map 150 that is displayed by the navigation module 146). The speed limit indicator graphic 156 may be displayed in a variety of ways. For example, the speed limit indicator graphic 156 may be displayed as a speed limit sign icon located in a fixed location over the map 150 (e.g., the lower right hand corner of the map 150, the upper left hand corner of the map 150, or in an impermanent location over map 150. The speed limit indicator graphic 156 may also be displayed in association with the roadway graphic 152 depicting the roadway being traversed by the user of the mobile electronic device 102 (e.g., adjacent to the roadway graphic 152, pinned to the roadway graphic 152, and so on). The speed limit indicator graphic 156 may further be displayed within a dashboard display 158 or like graphic associated with the map 150, and so on.

The speed limit display module 154 may be configured in a variety of ways. For example, as shown, the speed limit display module 154 may be configured as a component of the navigation module 146 (e.g., as a software routine or software module that is part of the navigation module 146). The speed limit display module 154 may also be configured as a separate application 142 accessed by the user interface 140.

The speed limit display module 154 may acquire speed limit information 160 from a variety of sources. For example, speed limit information 160 may be retrieved from map data 116 stored in memory 106. However, the speed limit information 160 may also be acquired from content 134 accessed via the network 118, and so on. In embodiments, the speed limit information 160 is geo-referenced (e.g., cross-referenced with geo-spatial coordinate information, e.g., latitude, longitude, altitude, and so on) to identify the posted speed limits along particular sections of roadways. The speed limit display module 154 may thus ascertain the speed limit for a section of roadway being traversed by the user by comparing the geo-referenced speed limit information 160 with the geographic position determined by the position-determining module 112. The speed limit display module 154 may further detect changes of the speed limit associated with the roadway as the roadway is traversed so that the speed limit displayed by the speed limit indicator graphic 156 remains current. A variety of techniques, such as map matching, and so on, may be employed to match the geographic position to the geo-referenced speed limit information.

The speed limit display module 154 is illustrated as including a notification module 162, which, like the speed limit display module 154, is storable in memory 106 and executable by the processor 104. The notification module 162 is representative of functionality to furnish a notification to a user of the mobile electronic device 102 that the indicated speed limit 164 for the roadway being traversed (e.g., the speed limit displayed by the speed limit indicator graphic 156) has changed or is about to change.

In an implementation, the notification module 162 includes functionality to detect changes in the indicated speed limit 164. For example, the notification module 162 may receive an indication of a change in the indicated speed limit 164 from the speed limit display module 154. In response, the notification module 162 may cause an attribute of the navigation information 148 displayed by the navigation module 146 to be temporarily altered, thereby furnishing a visible notification alerting the user of the mobile electronic device 102 to the change in the indicated speed limit 164. In some implementations, the reduced speed limit or warning message may be displayed in the center of the display area and/or it may momentarily fill the screen.

Attributes of the navigation information 148 that can be changed comprise any discernable, visual aspect, feature, or characteristic of the navigation information 148 including, but not limited to, the hue (color) of the map 150, the brightness of map 150 displayed by the display 120, the hue (color), size and/or shape of the speed limit indicator graphic 156, the hue (color), size and/or shape of the of the dashboard display 158 associated with the map 150, an icon displayed over the map 150, text displayed over the map 150, and so on. Thus, a variety of attributes of the navigation information 148 may be altered by the notification module 162. In one example, the notification module 162 may cause the hue of the map 150 to be momentarily changed from a default color (e.g., tan, blue, white, etc.) to a second color (e.g., red) when the indicated speed limit is reduced, and to a third color (e.g., green) when the indicated speed limit increased. Similarly, the notification module 162 may cause the hue of the speed limit indicator graphic 156 to be momentarily changed from a default color (e.g., tan, blue, white, etc.) to a second color (e.g., red) when the indicated speed limit is reduced, and to a third color (e.g., green) when the indicated speed limit increased. The size of the speed limit indicator graphic 156 may also be temporarily increased. Other attributes of the map may likewise be altered due to changes caused by the notification module 162.

It is contemplated that speed limit information 160 may not be available for some roadways or sections of roadways. For example, map data 116 retrieved from memory 106 by the speed limit display module 154 may lack speed limit information 160 for one or more roadways being traversed during navigation to a desired location. In such instances, the speed limit display module 154 may cause the indicated speed limit 164 to be replaced with one or more question marks ("??") to indicate that speed limit information is not available for the section of the roadway currently being traversed. To further alert the user to the lack of speed limit information, the notification module 162 may cause an attribute of the navigation information 148 to be temporarily altered to provide a visible notification. The notification module 162 may, for example, cause the hue of the map 150 and/or the speed limit indicator graphic 156 to be momentarily changed to a fourth color (e.g., yellow).

In some instances, the indicated speed limit 164 may be changed because the speed limit of a section of the roadway is temporarily reduced due to construction on the roadway. For example, the communication module 126 may be configured to receive traffic information configured to indicate construction zone speed limits cross-referenced with geo-spatial coordinate information (e.g., latitude, longitude, altitude, and so on). Such functionality enables updating of the speed limit information 160 in the map data 116. The speed limit information 160 stored in memory 106 may be received as content 134 accessed via the network 118 by the communication module 126. The speed limit display module 154 may cause the speed limit indicator graphic 156 to display the construction zone speed limit instead of the normal speed limit as the indicated speed limit 164 while the user is within the construction zone (e.g., as ascertained based on the geographic position of the mobile electronic device 102 determined by the position-determining module 112) and to thereafter revert back to display of the normal speed limit when the construction zone is passed. The notification module 162 may further cause an attribute of the navigation information 148 to be temporarily altered to provide a visible notification that the indicated speed limit 164 is changed to the construction zone speed limit. The notification module 162 may, for example, cause the hue (e.g., color) of the map 150 and/or the speed limit indicator graphic 156 to be momentarily changed to a fifth color (e.g., orange).

The notification module 162 may cause the intensity, the duration, or the frequency of the attribute to be varied in proportion to an amount of change in the indicated speed limit 164. For example, the notification module 162 may provide a first type of alert (e.g., a flashing red hue) for a large decrease in the indicated speed limit 164, and a second type of alert (e.g., a single flash of red hue) for a smaller decrease in the indicated speed limit 164. A threshold speed limit decrease or increase may be used to determine the type of alert provided. For example, the first type of alert may be provided for decreases in the indicated speed limit 164 of more than 20 miles per hour (mph) (e.g., from 75 mph to 45 mph), and the second type of alert may be provided for decreases in the indicated speed limit 164 of less than 20 mph (e.g., from 40 mph to 35 mph). Other examples are possible.

By altering the attributes of the displayed navigation information 148, the present techniques furnish a highly discernable, visual notification to alert the user to the speed limit change without unnecessarily distracting the user from other tasks such as driving the vehicle. For example, in implementations, the present techniques allow the map 150 and/or speed limit indicator graphic 156 to be made to appear to flash red one or more times when the speed limit is reduced, flash green one or more time when the speed limit is increased, flash yellow when speed limit information is unavailable (e.g., when transitioning to a roadway for which speed limit information 160 is not provided in the map data 116), flash orange when the speed limit is reduced due to construction, and so on.

Audible warnings denoting the change in the indicated speed limit 164 may also be furnished to the user in addition to or in place of the visual notification provided by the altered map attribute. For example, the notification module 162 may be configured to cause a speaker (e.g., an I/O device 124) to play an audible sound or warning (e.g., a short tone, the spoken phrase "The speed limit has decreased to 45 miles per hour," and so on) to alert the user to a change in the indicated speed limit 164.

Figure 2A:
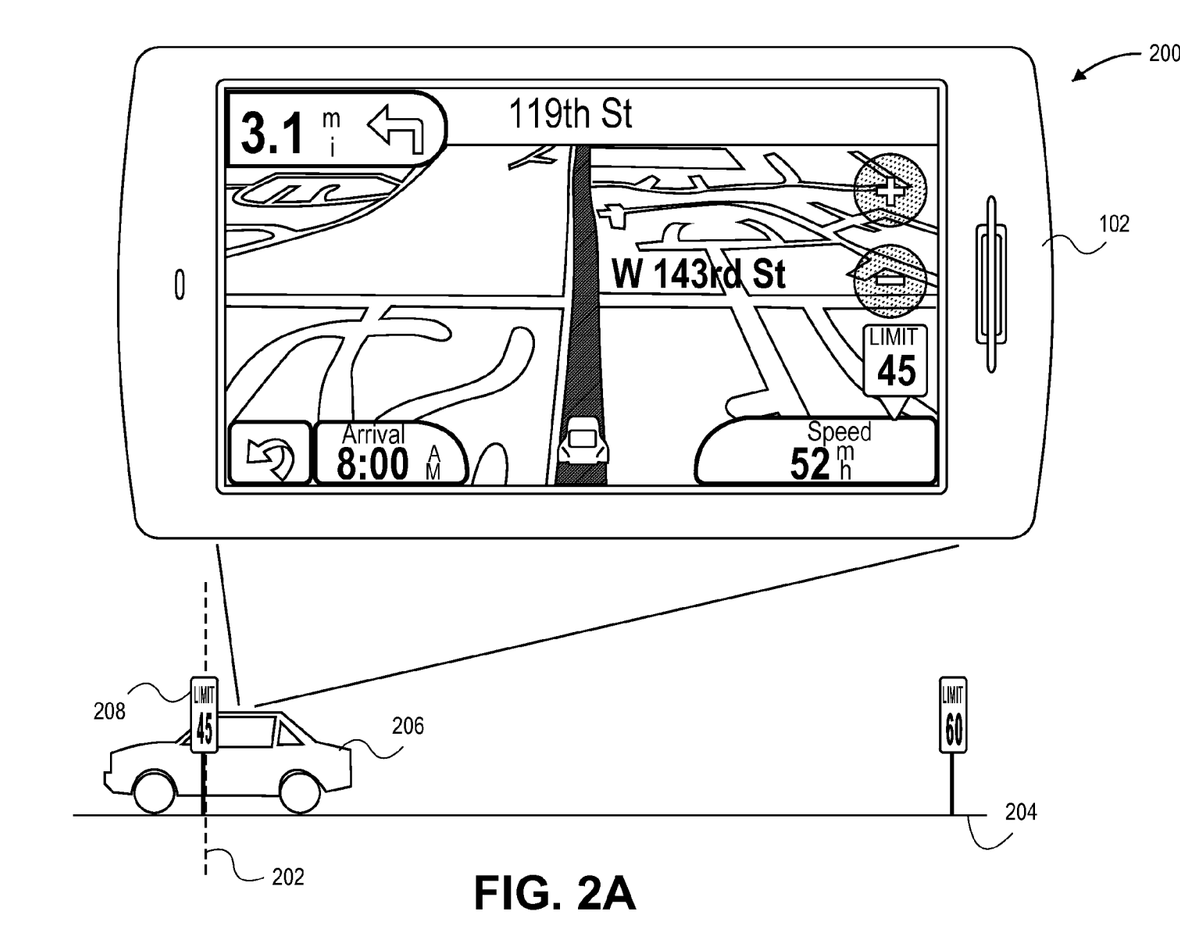
FIGS. 2A and 2B are illustrations illustrating notification schemes for alerting a user of the mobile electronic device of FIG. 1 to a change in the indicated speed limit of the roadway.

In various embodiments, the mobile electronic device 102 may be configured to alert the user to the change in the indicated speed limit 164 by providing the notification at the time the indicated speed limit 164 changes. In such embodiments, the notification module 162 is configured to temporarily change the display attribute of the navigation information 148 when the determined geographic position of the mobile electronic device 102 is at least approximately matched to the location where the speed limit associated with the roadway changes. For example, in the notification scheme 200 shown in FIG. 2A, the notification module 162 may cause the map attribute to be altered at the precise point 202 where the speed limit changes along the roadway 204 (e.g., at the point 202 along the roadway 204 where a vehicle 206 operated by a user of the mobile electronic device 102 passes a speed limit sign 208 posting the new speed limit).

Additionally, or alternatively, the mobile electronic device 102 can be configured to give an advance warning prior to the change in the indicated speed limit 164. In such embodiments, the notification module 162 is configured to temporarily change the display attribute of the map 150 when the determined geographic position is within a predetermined or dynamically-calculated distance of the location where the speed limit associated with the roadway changes. For example, in the notification scheme 210 shown in FIG. 2B, the notification module 162 may cause the map attribute to be altered at a distance ("D") prior to the point 202 where the speed limit changes along the roadway 204 (e.g., a distance ("D") prior to the point 202 along the roadway 204 where the vehicle 206 passes the speed limit sign 208 posting the new speed limit).

Figure 2B:
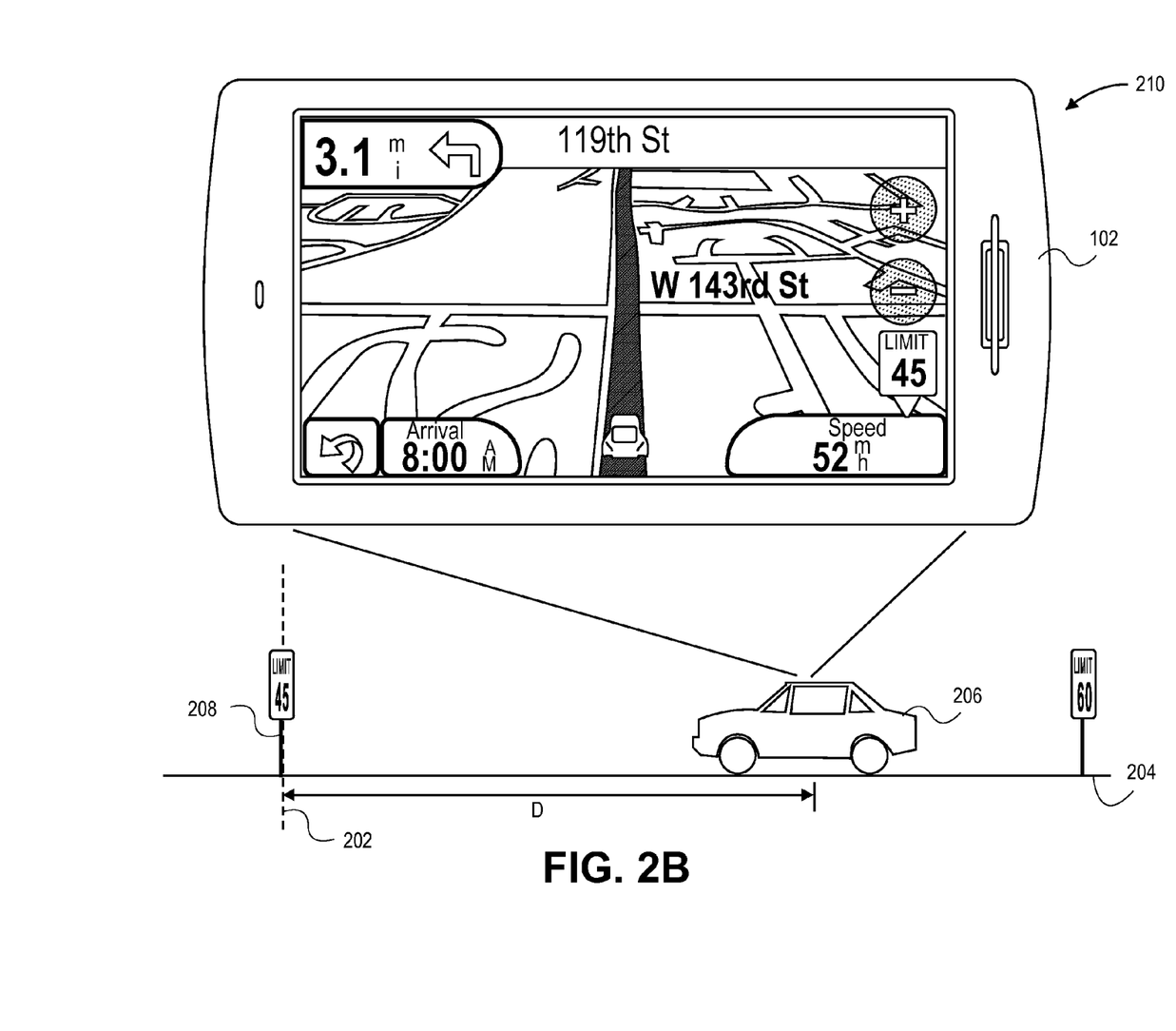

In one or more embodiments, the distance ("D") may be a predetermined, fixed distance (e.g., 100 yards, 0.10 miles, etc.). However, the notification module 162 may also be configured to furnish dynamic advanced warnings suitable for the particular driving conditions encountered, presently-traversed route, and/or expected user path. For example, the notification module 162 may calculate the distance ("D") based on various factors such as the speed of the vehicle 206, the necessary acceleration/deceleration required based on the current and future speed limits (e.g., a greater advance warning may be provided for a speed limit decrease from 60 mph to 45 mph than a speed limit decrease from 60 mph to 55 mph), user driving habits, calculated route information, road categories (e.g., a greater advance warning may be provided for highway speed limit changes than for residential speed changes), road conditions, weather conditions, traffic conditions, time of day, extent of curves on the road being traversed, and so on.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the mobile electronic device 102 of FIG. 1 can be wired, wireless, or some combination thereof. In the case of a software implementation, for instance, the module represents executable instructions that perform specified tasks when executed on a processor, such as the processor 104 with the mobile electronic device 102 of FIG. 1. The program code can be stored in one or more device-readable storage media, an example of which is the memory 106 associated with the mobile electronic device 102 of FIG. 1.

Example Procedures

The following discussion describes procedures that may be implemented in a mobile electronic device providing navigation functionality. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1. The features of techniques described below are platform-independent, meaning that the techniques may be implemented on a variety of commercial mobile electronic device platforms having a variety of processors.

Figure 3:
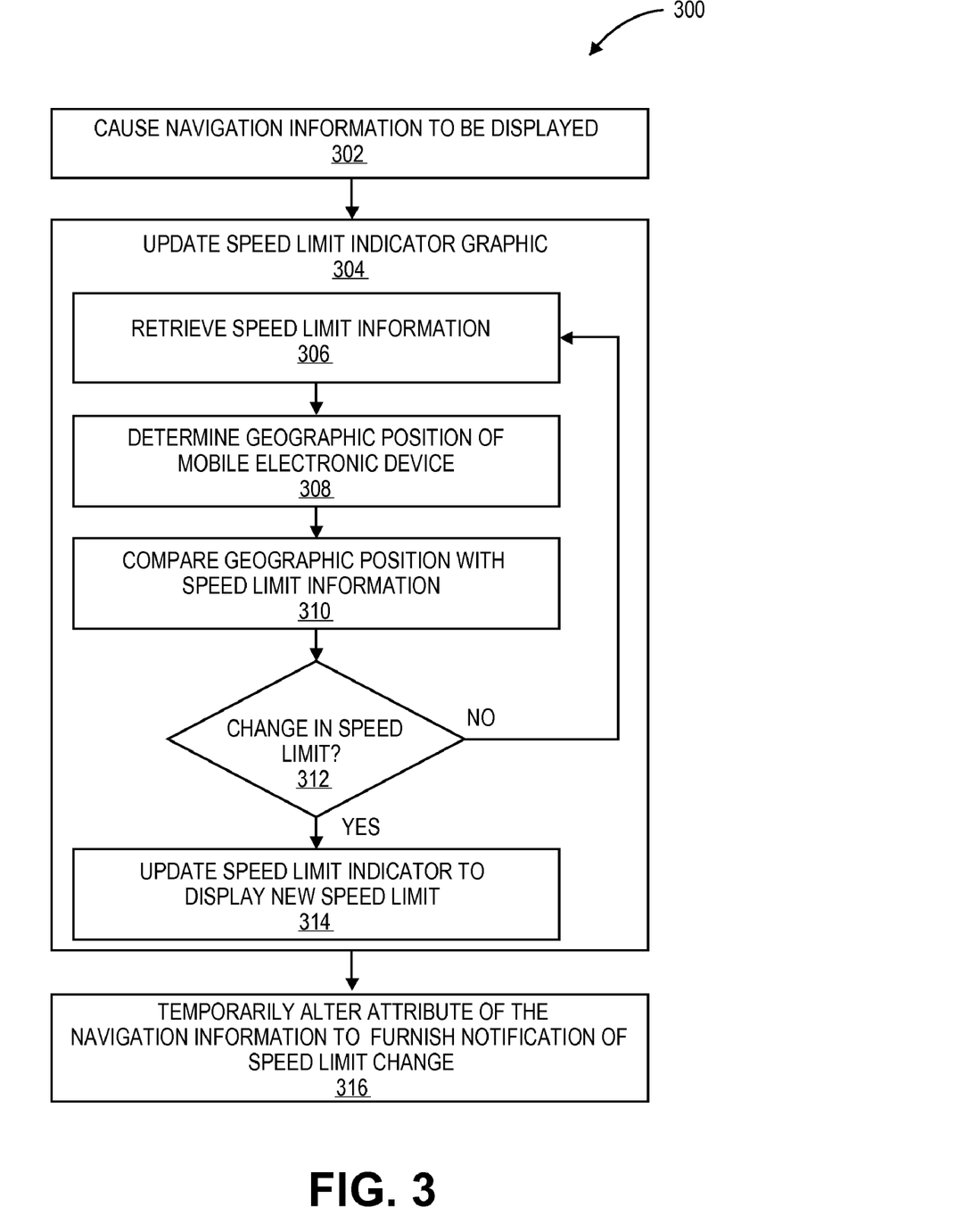
FIG. 3 is a flow diagram depicting a procedure in an example implementation in which a mobile electronic device providing navigation functionality is configured to furnish a notification of a change in the indicated speed limit of a roadway being traversed.

FIG. 3 depicts a procedure 300 in an example implementation in which a mobile electronic device providing navigation functionality is configured to furnish a discernable, visual notification of a change in the indicated speed limit of a roadway being traversed. As shown in FIG. 3, the display of a mobile electronic device is configured to cause navigation information, which may include a map such as a moving map, to be displayed (Block 302) for furnishing navigation functionality to a user of the mobile electronic device. The navigation information includes a roadway graphic (displayed on the map) representing a roadway being traversed and a speed limit indicator graphic to indicate the speed limit associated with the roadway.

As the user traverses the roadway, the indicated speed limit displayed by the speed limit indicator graphic is updated (Block 304) to reflect the changes in speed limit of the roadway. For instance, in the implementation illustrated, speed limit information may be retrieved (Block 306) to identify locations where the speed limits of the roadway change. The speed limit information may be retrieved from a variety of sources. For example, geo-referenced speed limit information may be retrieved from map data 116, from content 134 accessed via the network 118, and so on. The geo-referenced speed limit information includes information identifying speed limits associated with mapped roadways and/or locations along the roadways where the speed limits change cross-referenced with geo-spatial coordinate information (e.g., latitude, longitude, altitude, and so on). As the user traverses the roadway, the geographic position of the mobile electronic device is periodically determined (Block 308). For example, the geographic position of the mobile electronic device 102 may be determined by the position-determining module 112, signal data 108 transmitted by position data platforms, position data transmitters such as GPS satellites 110, and/or content 134 accessed via the network 118. The geographic position is compared with the speed limit information for the roadway (Block 310) using techniques such as map matching, or the like, to detect when a change in the speed limit of the roadway is encountered (Decision Block 312). When a change in the speed limit is encountered ("YES" from Decision Block 312), the speed limit indicator graphic is updated to display the new speed limit (Block 314). Otherwise ("NO" from Decision Block 312), a new geographic position is determined (Block 306) for comparison with the speed limit information for the roadway (Block 310).

When the speed limit indicated by the speed limit indicator graphic is updated (Block 314), an attribute of the navigation information is temporarily altered to provide a notification of the change (Block 316) as discussed in the description of FIG. 1.

When the user is traversing a roadway in an area with an applicable minimum speed limit or a change in the minimum speed limit, the mobile electronic device 102 may additionally or alternatively warn the user of the change in the minimum speed limit and/or indicate the minimum speed limit.

In some embodiments, the mobile electronic device 102 may notify the user of changes in the speed limit for construction zones, school zones, pedestrian zones, bicycling zones, off-ramps and on-ramps, parking zones, areas lacking roadway data (unmarked roads, driveways, parking lots, etc.) and/or other special-purpose areas. For example, the mobile electronic device 102 may provide specific warnings for these various zones to indicate the nature of the change in speed limit, such as by presenting a special visual and/or audible cue for an upcoming school zone different than that used for typical speed limit changes. The mobile electronic device 102 may also warn the user of the posted speed limits for entrance and exit ramps, tight turns with posted speed limits, combinations thereof, and the like as the user approaches and/or traverses through them.

In some embodiments, the mobile electronic device 102 may anticipate the user's future path (based on a calculated route or expectations regarding the user's future path such as the user's roadway horizon) and provide speed limit warnings based on the expected future path. By anticipating the user's future path, advance warning may be given regarding changes in the posted speed limit even if the roadway corresponding to a changing speed limit is not directly in front of the user's current position.

Example Displays

The following discussion describes example display screens that may be generated using the processes and techniques discussed herein. Aspects of the display screens may be generated in hardware, firmware, software, or a combination thereof. In portions of the following discussion, reference will be made to the environment 100 of FIG. 1, the procedures 300 of FIG. 3, and/or other example environments and procedures.

FIGS. 4A through 4C, 5A through 5C, and 6A and 6B, illustrate example display screens 400, 500, 600 of the display 120 of a mobile electronic device 102 that have been configured to implement procedure 300. As shown, the display screens 400, 500, 600 have been configured to display navigation information 402, 502, 602 that includes a map 404, 504, 604 including a roadway graphic 406, 506, 606 depicting the roadway being traversed by the user of the mobile electronic device 102 (FIG. 1). The roadway graphic 406, 506, 606 may be highlighted to indicate to a user that the roadway graphic 406, 506, 606 represents the roadway being traversed. For example, the roadway graphic 406, 506, 606 may be made a different color and thickness than graphics representing other roadways within the map 404, 504, 604. A user graphic 408, 508, 608 such as an arrow, an automobile icon, human or non-human figure, or the like, is displayed to indicate the location of the user (i.e., of the mobile electronic device 102). The map 404, 504, 604 illustrated employs a three dimensional (3D) display orientation. However, it is contemplated that a map 404, 504, 604 employing a track up orientation or north up orientation may also be provided.

A speed limit indicator graphic 410, 510, 610 is displayed over the map 404, 504, 604 to indicate the speed limit associated with the roadway represented by the roadway graphic 406, 506, 606. In the implementations illustrated, the speed limit indicator graphic 410, 510, 610 is furnished as a speed limit sign icon pinned to the map 404, 504, 604 near the bottom right corner of the map 404, 504, 604. However, it is contemplated that the speed limit indicator graphic 410, 510, 610 may have other formats and/or may be displayed in a variety of ways on the map 404, 504, 604. For example, the speed limit indicator graphic 410, 510, 610 may be displayed at other locations on the map 404, 504, 604 within a dashboard display 412, 512, 612 associated with the map 404, 504, 604 in association with a roadway graphic 406, 506, 606 (e.g., adjacent to the roadway graphic 406, 506, 606, pinned to the roadway graphic 406, 506, 606, etc.), and so on.

Figure 4A:
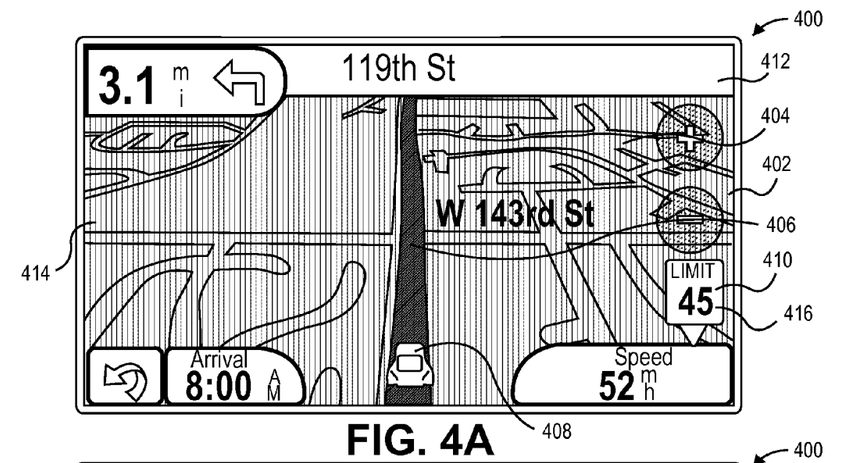
FIGS. 4A through 4C are illustrations of a display screen of the mobile electronic device of FIG. 1, wherein the hue of a map displayed by the display screen is momentarily altered to furnish notification of a change in the indicated speed limit of the roadway being traversed.
Figure 4B:
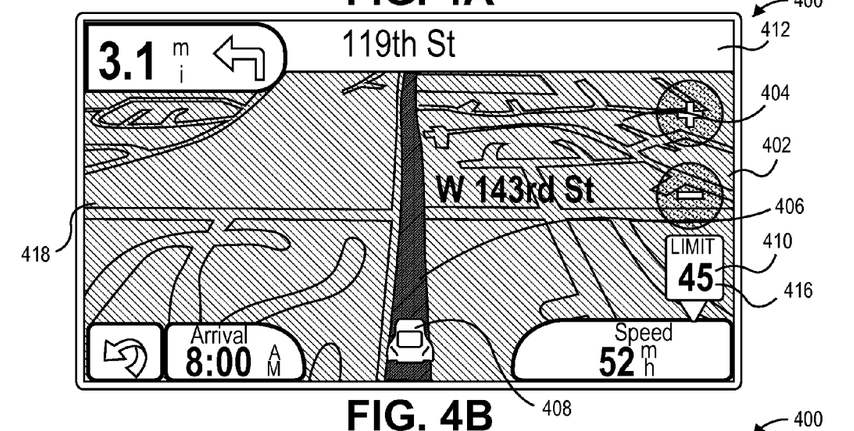
Figure 4C:
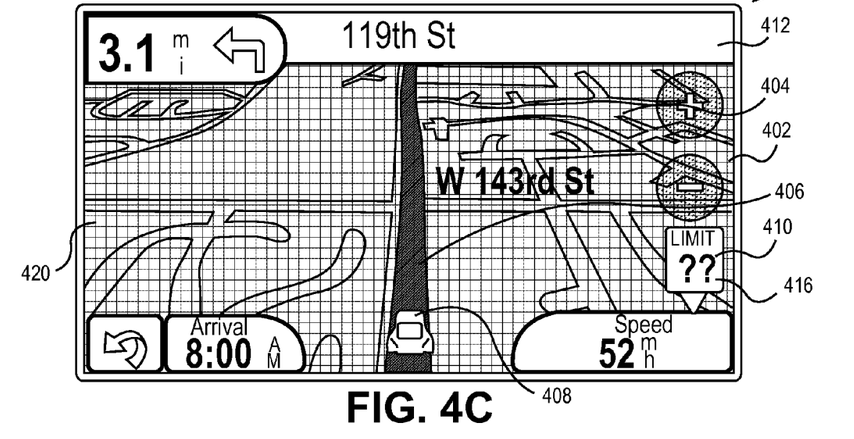
Figure 5A:
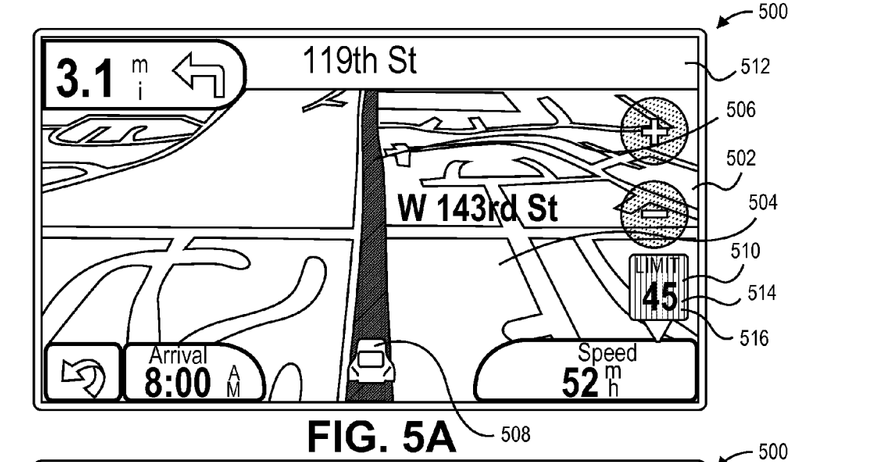
FIGS. 5A through 5C are illustrations of a display screen of the mobile electronic device of FIG. 1, wherein the hue of a speed limit indicator graphic displayed by the display screen is momentarily altered to furnish notification of a change in the indicated speed limit of the roadway being traversed.
Figure 5B:
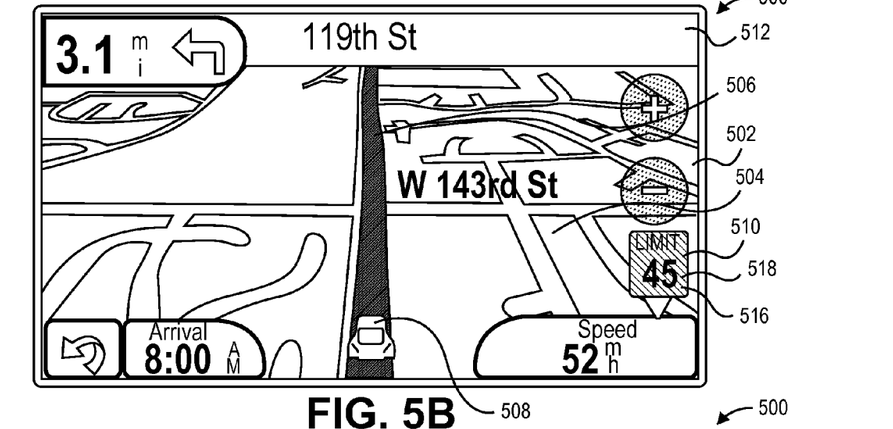
Figure 5C:
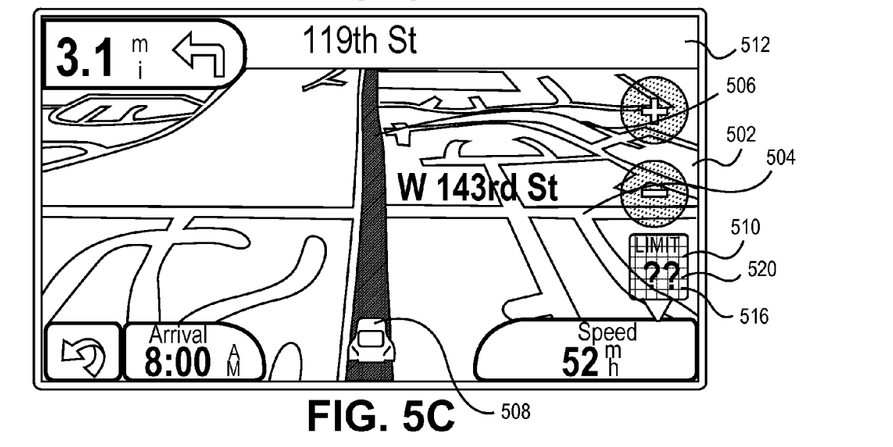

In FIGS. 4A through 4C, the hue (color) of the map 404 is illustrated as being momentarily changed from a default color (e.g., tan, blue, white, etc.), not pictured, to a second color (red) 414 when the indicated speed limit 416 is reduced (FIG. 4A), to a third color (green) 418 when the indicated speed limit 416 increased (FIG. 4B), and to a fourth color (yellow) 420 when speed limit information is not available (FIG. 4C). Similarly, in FIGS. 5A through 5C, the hue (color) of the speed limit indicator graphic 510 is illustrated as being momentarily changed from a default color (e.g., tan, blue, white, etc.), not pictured, to a second color (red) 514 when the indicated speed limit 516 is reduced (FIG. 5A), to a third color (green) 518 when the indicated speed limit 516 increased (FIG. 5B), and to a fourth color (yellow) 520 when speed limit information is not available (FIG. 5C). Additionally, in FIGS. 4C and 5C, the indicated speed limit 416, 516 is replaced with one or more question marks ("??") within the speed limit indicator graphic 410, 510 because the current speed limit is unknown.

Figure 6A:
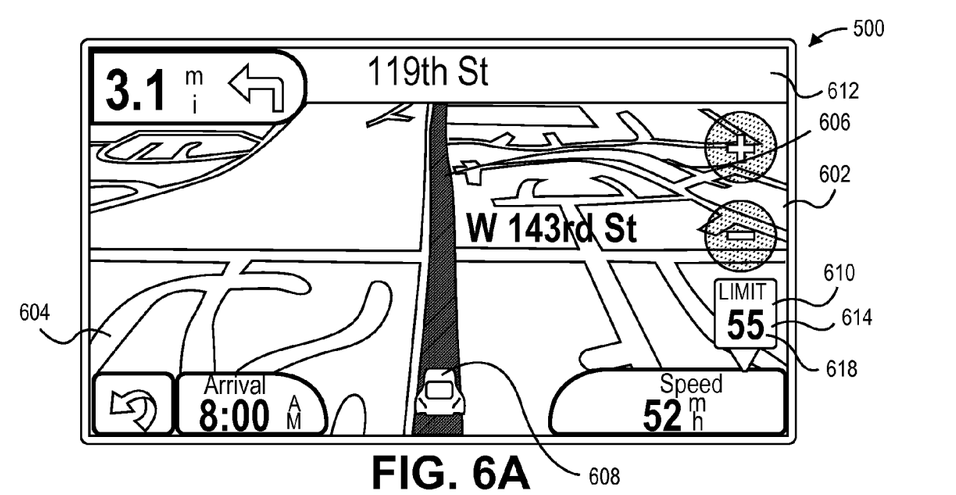
FIGS. 6A and 6B are illustrations of a display screen of the mobile electronic device of FIG. 1, wherein the size of the speed limit indicator graphic displayed by the display screen is altered to momentarily grow larger to furnish notification of a change in the indicated speed limit of the roadway being traversed.
Figure 6B:
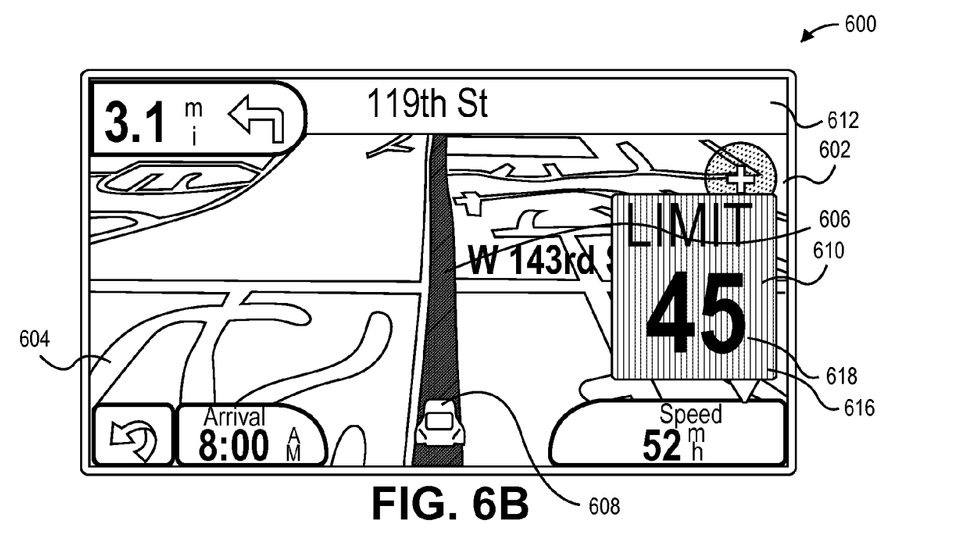

In FIGS. 6A and 6B, the size of the speed limit indicator graphic 610 is momentarily increased from a normally displayed size 614 (FIG. 6A) to an enlarged size 616 (FIG. 6B) to furnish a notification of a decrease in the indicated speed limit 618 (e.g., a decrease in the indicated speed limit from 55 mph to 45 mph). Additionally, the hue (color) of the speed limit indicator graphic 610 is illustrated as being momentarily changed from a default color (e.g., tan, blue, white, etc.), shown in FIG. 6A, to a second color (red) 618, shown in FIG. 6B.

CONCLUSION

Although techniques to furnish a notification that the speed limit of a roadway being traversed has changed have been described in language specific to structural features and/or methodological acts, it is to be understood that the appended claims are not necessarily limited to the specific features or acts described. Rather, the specific features and acts are disclosed as exemplary forms of implementing the claimed devices and techniques.

What is claimed is:

1. A mobile electronic device comprising:
a display device; a memory operable to store one or more modules; and
a processing system operable to execute the one or more modules to:
anticipate a future path of the mobile electronic device;
cause navigation information to be displayed by the display device, the navigation information including a roadway graphic configured to represent a roadway and a speed limit indicator graphic configured to indicate a speed limit associated with the roadway; and
temporarily alter a display attribute of the navigation information to furnish a notification of a change in the indicated speed limit based on the anticipated future path;
wherein the navigation information further includes a map and the display attribute comprises a hue of at least one of the map or the speed limit indicator graphic, and
wherein the hue of the display attribute is momentarily changed from a default color to a second color when the speed limit decreases, to a third color when the speed limit increases, and to a fourth color when speed limit information is not available for the roadway.

2. The mobile electronic device as recited in claim 1, further comprising a position-determining module operable to receive satellite navigation signals and determine a geographic position of the mobile electronic device using the received satellite navigation signals, wherein the memory is operable to store map data including speed limit information, the speed limit information identifying a location where the speed limit associated with the roadway changes.

3. The mobile electronic device as recited in claim 2, wherein the module is configured to temporarily change the display attribute when the determined geographic position is at least approximately matched to the location where the speed limit associated with the roadway changes.

4. The mobile electronic device as recited in claim 2, wherein the module is configured to temporarily change the display attribute when the determined geographic position is within a predetermined distance of the location where the speed limit associated with the roadway changes.

5. The mobile electronic device as recited in claim 2, wherein the module is further configured to temporarily change the display attribute to furnish a notification that the speed limit information is not available for the roadway.

6. The mobile electronic device as recited in claim 1, wherein the second color comprises red, the third color comprises green, and the fourth color comprises yellow.

7. The mobile electronic device as recited in claim 1, further comprising a communication module configured to receive traffic information, the traffic information including a construction zone speed limit, wherein the module causes the hue to be temporarily changed to a fifth color when the indicated speed limit is changed to the construction zone speed limit.

8. The mobile electronic device as recited in claim 7 wherein the second color comprises red, the third color comprises green, the fourth color comprises yellow, and the fifth color comprises orange.

9. The mobile electronic device as recited in claim 5, wherein the display attribute further comprises a size of the speed limit indicator graphic, and wherein the module causes the size of the speed limit indicator graphic to momentarily increase.

10. The mobile electronic device as recited in claim 9, wherein the module causes the speed limit indicator graphic to display at least one question mark ("?") when speed limit information is not available for the roadway.

11. The mobile communication device as recited in claim 1, wherein the module is configured to vary at least one of an intensity, a duration, or a frequency of the display attribute in proportion to an amount of change in the speed limit.

12. A mobile electronic device comprising:
   a memory operable to store map data comprising speed limit information that includes speed limits associated with a roadway being traversed;
   a display device operable to display navigation information generated using the map data, the navigation information configured to include a roadway graphic that represents the roadway being traversed and a speed limit indicator graphic that indicates a speed limit associated with the roadway;
   a position-determining module operable to receive satellite navigation signals and determine a geographic position of the portable electronic device using the received satellite navigation signals;
   a processing system operable to execute at least one module to anticipate a future path of the mobile electronic device, detect a change in the speed limit associated with the roadway by comparing the determined geographic position of the mobile electronic device with the speed limit information and change the indicated speed limit, the at least one module configured to temporarily alter a display attribute of the navigation information to furnish a notification of a change in the indicated speed limit based on the anticipated future path; and
   wherein the navigation information further includes a map and the display attribute comprises a hue of at least one of the map or the speed limit indicator graphic, and
   wherein the hue of the display attribute is momentarily changed from a default color to a second color when the speed limit decreases, to a third color when the speed limit increases, and to a fourth color when speed limit information is not available for the roadway.

13. The mobile electronic device as recited in claim 12, wherein the module is further configured to temporarily change the display attribute to furnish a notification that speed limit information is not available for the roadway.

14. The mobile electronic device as recited in claim 12, further comprising a communication module configured to receive traffic information, the traffic information including a construction zone speed limit, wherein the at least one module causes the hue to be temporarily changed to a fifth color when the indicated speed limit is changed to the construction zone speed limit.

15. The mobile electronic device as recited in claim 14, wherein the future path is based on at least one of a calculated route and a roadway horizon.

16. The mobile electronic device as recited in claim 12, wherein the display attribute further comprises a size of the speed limit indicator graphic, and wherein the module causes the size of the speed limit indicator graphic to momentarily increase.

17. The mobile communication device as recited in claim 12, wherein the module is configured to vary at least one of an intensity, a duration, or a frequency of the display attribute in proportion to the change in the speed limit.

18. A method comprising:
   causing navigation information to be displayed on a display of a mobile electronic device, the navigation information including a roadway graphic representing a roadway being traversed by the mobile electronic device and a speed limit indicator graphic for indicating the speed limit associated with the roadway;
   causing a future path of the mobile electronic device to be anticipated;
   causing the indicated speed limit to be changed in response to a change in the speed limit of the roadway; and
   causing an attribute of the navigation information to be temporarily altered to furnish a notification of the change in the indicated speed limit based on the anticipated future path;
   wherein the navigation information further includes a map and the display attribute comprises a hue of at least one of the map or the speed limit indicator graphic, and
   wherein the hue of the display attribute is momentarily changed from a default color to a second color when the speed limit decreases, to a third color when the speed limit increases, and to a fourth color when speed limit information is not available for the roadway.

19. The method as recited in claim 18, wherein the navigation information further includes a map and the display attribute comprises a hue of at least one of the map or the speed limit indicator graphic, and wherein the second color comprises red, the third color comprises green, and the fourth color comprises yellow.

* * * * *